United States Patent
Heady

(10) Patent No.: US 11,796,373 B2
(45) Date of Patent: Oct. 24, 2023

(54) SUMP PUMP FAILURE DEVICE

(71) Applicant: Timothy P. Heady, Des Moines, IA (US)

(72) Inventor: Timothy P. Heady, Des Moines, IA (US)

(73) Assignee: Timothy P. Heady, Des Moines, IA (US)

( * ) Notice: Subject to any disclaimer, the term of this patent is extended or adjusted under 35 U.S.C. 154(b) by 265 days.

(21) Appl. No.: 17/017,943

(22) Filed: Sep. 11, 2020

(65) Prior Publication Data
US 2022/0082096 A1    Mar. 17, 2022

(51) Int. Cl.
*G01F 23/00*    (2022.01)
*F04B 23/02*    (2006.01)

(52) U.S. Cl.
CPC ........ *G01F 23/0007* (2013.01); *F04B 23/021* (2013.01)

(58) Field of Classification Search
CPC ............. G01F 23/0007; G01F 23/0053; F04B 23/021; F17D 5/02; Y10T 137/5762; Y10T 137/5835; G01M 3/2807; F16L 2201/30; F16L 55/1604
See application file for complete search history.

(56) References Cited

U.S. PATENT DOCUMENTS 10,000,883 B1 *   6/2018   Nolan ................... B65D 1/34

OTHER PUBLICATIONS

Boat and Marine Cup Holders, Cudas Customs, web snapshot from Jul. 2019 accessed through https://web.archive.org/web/20190724125111/http://www.cudascustoms.com/products.htm (Year: 2019).*
Beckson Family of Cup Holders, Beckson Marine, Inc., web snapshot from Feb. 2015 accessed through https://web.archive.org/web/20160206074752/https://beckson.com/glsshldr.html (Year: 2015).*
Flower Planter Wall Hanging—Wall Flower Pot—Rattan, AliExpress, Mar. 23, 2020, accessed online through https://www.aliexpress.us/item/3256803908028971.html (Year: 2020).*

* cited by examiner

*Primary Examiner* — David Z Huang
(74) *Attorney, Agent, or Firm* — Fredrikson & Byron, P.A.

(57) ABSTRACT

Owners of sump pumps often have no way of identifying a sump pump is failing unless they are home to witness a failing sump pump in real-time. Current solutions to this issue rely on the use of expensive electronics to help alert the owner of a failing sump pump. The present disclosure offers an inexpensive solution to extend a time in which an owner can confirm the sump pump has failed or is about to fail. Namely, the present disclosure features a level indicator which retains some water in the event the water rises above a predetermined level.

16 Claims, 6 Drawing Sheets

SUMP PUMP FAILURE DEVICE

FIELD OF THE INVENTION

The present invention relates generally to a device and corresponding method of use in at least the basement waterproofing industry. More particularly, but not exclusively, the present invention relates to a non-electric level indicator allowing persons to detect a failing or underperforming sump pump, effectively facilitating the prevention of future flooding.

BACKGROUND OF THE INVENTION

The background description provided herein gives context for the present disclosure. Work of the presently named inventors, as well as aspects of the description that may not otherwise qualify as prior art at the time of filing, are neither expressly nor impliedly admitted as prior art.

A sump pump is a pump used to remove water that has accumulated in a water-collecting sump or basin, commonly found in the basements of homes. The water may enter via the perimeter drains of a basement waterproofing system, funneling into the sump. Sump pumps are used where basement flooding happens regularly and to solve dampness where the water table is above the foundation of a home. Sump pumps send water away from a house to any place where it is no longer problematic, such as a municipal storm drain or a dry well.

A failing sump pump can cause a basement to flood, such as during a severe storm. Predicting the failure of a sump before it happens can prevent significant property damage. Sump pumps can fail if a component of the pump breaks, the power goes out, or if the pump is undersized and cannot pump at a flow rate faster than that in which water is entering the sump.

Thus far, known means for mitigating the failure of a sump pump are complex, expensive, and require some sort of real-time response to prevent further damage. In a first example, a backup sump pump is included in the sump pump system to pump water in the event the primary pump fails. In yet another example, advanced sensors and communication devices are included in the sump. The sensors and the communications devices work together to alert a property owner to potential failure of the sump pump.

SUMMARY OF THE INVENTION

Therefore, it is a primary object, feature, and/or advantage of the present invention to provide a level indicator that retains water to indicate that a sump pump is failing or underperforming. This may extend a time in which an owner can confirm the sump pump has failed or is about to fail.

It is still yet a further object, feature, and/or advantage of the present invention to provide a level indicator that is located entirely below the basement floor, within the sump.

It is still yet a further object, feature, and/or advantage of the present invention to provide a level indicator that may be used in a wide variety of applications. For example, the level indicator may be adapted to detect whether any space has been formerly occupied by water or even whether a larger body of water (e.g., a lake) has or has not risen above a predetermined level.

It is still yet a further object, feature, and/or advantage of the present invention to provide a safe, cost effective, and durable level indicator. For example, the level indicator could be easily and cheaply manufactured using a three dimensional printer; the level indicator is preferably includes no electronics; and the level indicator can be installed solely through the use of fasteners commonly made available for sale in any home improvement store.

It is still yet a further object, feature, and/or advantage of the present invention to provide a level indicator which includes a means for delaying, significantly, the time period in which a person must be present to observe that the sump pump is failing or underperforming. For example, a bucket retaining water may be sized appropriately such that if the bucket is filled with water, due to the presence of water rising above a predetermined level within the sump, a few weeks could pass until all of the water evaporates. Alternatively, the bucket could include a liquid contact indicator (LCI) which turns from white into another color, typically red, after contact with water.

It is still yet a further object, feature, and/or advantage of the present invention to provide a level indicator having a distinct aesthetic appearance.

It is still yet a further object, feature, and/or advantage of the present invention to practice methods which facilitate use, manufacture, assembly, maintenance, and repair of a level indicator accomplishing some or all of the previously stated objectives.

It is still yet a further object, feature, and/or advantage of the present invention to incorporate the level indicator within a sump or sump pump system accomplishing some or all of the previously stated objectives.

The previous objects, features, and/or advantages of the present invention, as well as the following aspects and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

According to some aspects of the present disclosure, a level indicator comprises a sidewall enclosed on all sides, a bottom surface to retain fluid captured within the perimeter, and a tab extending orthogonally from the perimeter beyond the depth. The sidewall has a depth and a perimeter traversing said depth. The perimeter comprises an arc and a chord. The arc and the chord are located within a common plane perpendicular to the depth. The tab is configured to fasten the level indicator to another object.

According to some additional aspects of the present disclosure, the perimeter can be a circular, minor segment. Alternatively, the arc can be a circular, major arc and the perimeter can further comprise parallel protrusions extending orthogonally from the chord toward the circular, major arc. The bottom surface can be parallel with the perimeter. A fillet can be included between the sidewall and the bottom surface. The level indicator can include a liquid contact indicator. The tab can extend upwardly from the perimeter, and another tab can extend downwardly and orthogonally from the perimeter beyond said depth. The level indicated can be produced with a three-dimensional printer and the level indicator can include no electronics.

According to some other aspects of the present disclosure, a sump pump system comprises a sump positioned to collect fluid from a first, elevated environment, a pipe to carry at least some of the fluid from the sump to a second, external environment, a sump pump for forcing the at least some of the fluid to the second, external environment, and a level indicator secured to the pump or an interior wall of the sump at a location remote of the sump pump and below the first, elevated environment.

According to some additional aspects of the present disclosure, the first, elevated environment is the basement of a home, and the second, external environment is a municipal storm drain, a dry well, or a sanitary sewer system. The sump pump system can alternatively include at least one additional pipe not in fluid communication with the sump pump and can be configured to carry at least some of the fluid to a third, deeper, and/or external environment. The third, deeper, and/or external environment can be an exterior drainage system, such as a French drain. The sump pump can be a submersible sump pump positioned toward a lower portion of the sump, or the sump pump can be a pedestal sump pump with a motor mounted above the sump.

According to some other aspects of the present disclosure, a method of indicating a liquid has risen above a predetermined level without electronics comprises locating the predetermined level by anticipating where an existence of liquid is problematic, positioning a bucket below where the existence of liquid is problematic yet above where the existence of liquid is to be ordinarily expected, configuring the bucket to retain some of the liquid if the liquid rises above the predetermined level, and confirming the bucket has, at least at one point in time, retained water, thereby indicating the liquid rose above the predetermined level.

According to some additional aspects of the present disclosure, the method further comprising placing a liquid contact indicator within the bucket to extend a time in which the confirming step can be accomplished. Even further, the method can further comprise removing an obstruction, such as a lid to a sump, such that the bucket can be viewed.

These and/or other objects, features, advantages, aspects, and/or embodiments will become apparent to those skilled in the art after reviewing the following brief and detailed descriptions of the drawings.

Figure 1:
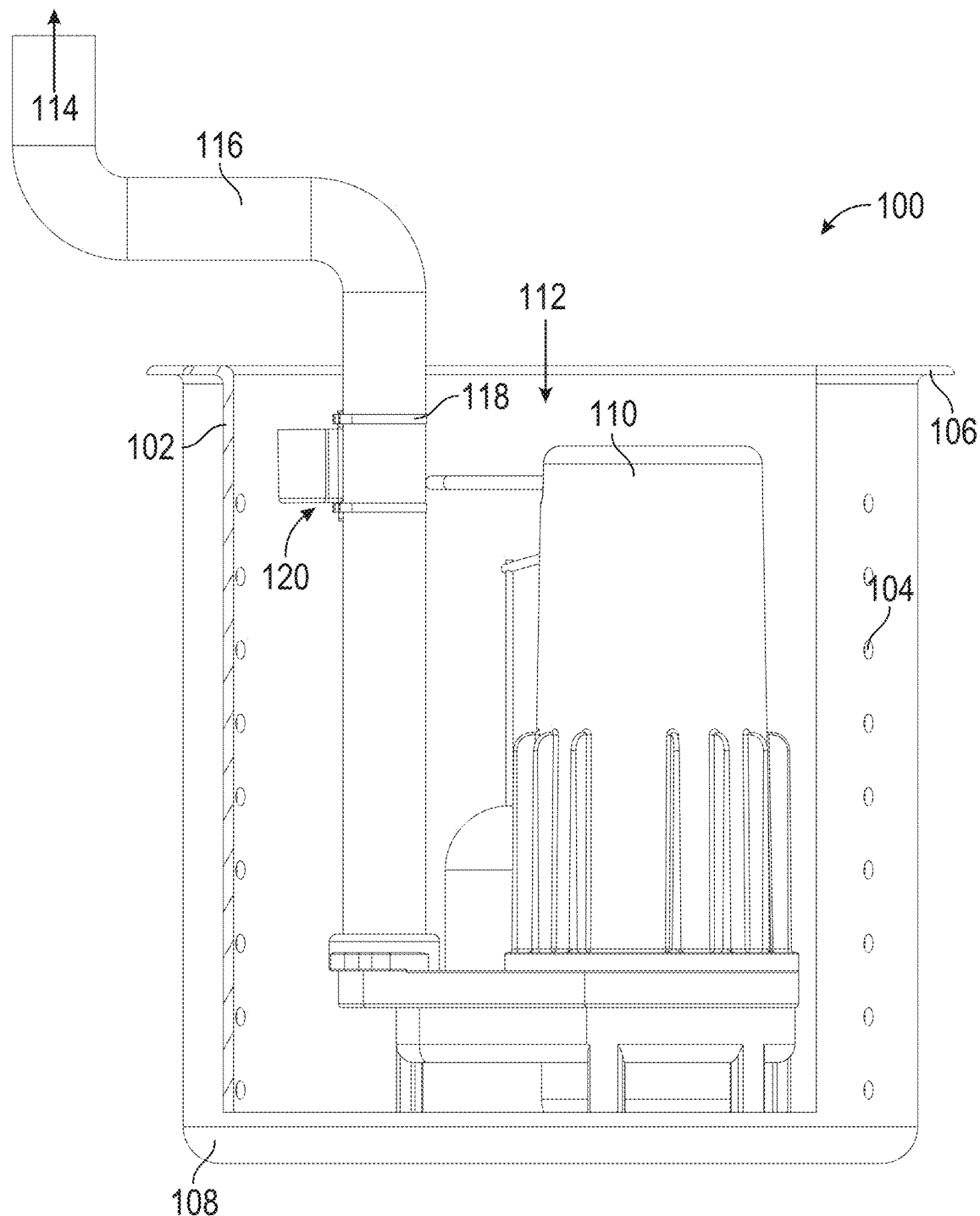
FIG. 1 shows an illustrative plan view of an environment for a sump employing a level indicator, according to some aspects of the present disclosure.

Several embodiments in which the present invention may be practiced are illustrated and described in detail, wherein like reference characters represent like components throughout the several views. The drawings are presented for exemplary purposes and may not be to scale, unless otherwise indicated, and thus proportions of features in the drawings shall not be construed as evidence of actual proportions.

DETAILED DESCRIPTION OF THE INVENTION

Definitions—Introductory Matters

The following definitions and introductory matters are provided to facilitate an understanding of the present invention. Unless defined otherwise, all technical and scientific terms used herein have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" as used herein are not intended to refer to any single embodiment of the particular invention but encompass all possible embodiments as described in the specification and the claims.

The term "about" as used herein refers to slight variations in numerical quantities with respect to any quantifiable variable. One of ordinary skill in the art will recognize inadvertent error can occur, for example, through use of typical measuring techniques or equipment or from differences in the manufacture, source, or purity of components. The claims include equivalents to the quantities whether or not modified by the term "about."

The term "configured" describes an apparatus, system, or other structure that is constructed to perform or capable of performing a particular task or to adopt a particular configuration. The term "configured" can be used interchangeably with other similar phrases such as constructed, arranged, adapted, manufactured, and the like.

Terms characterizing a sequential order (e.g., first, second, etc.), a position (e.g., top, bottom, sides, forward, aft, etc.), and/or an orientation (e.g., width, length, depth, thickness, vertical, horizontal, etc.) are referenced according to the views presented. Unless context indicates otherwise, these terms are not limiting. The physical configuration of an object or combination of objects may change without departing from the scope of the present invention.

As would be apparent to one of ordinary skill in the art, mechanical, procedural, or other changes may be made without departing from the spirit and scope of the invention. The scope of the invention is defined only by the appended claims, along with the full scope of equivalents to which such claims are entitled.

Overview

A sump 100 is positioned to collect fluid from a first, elevated environment 112. For example, the sump 100 may be positioned beneath a floor of a basement.

The sump includes a liner 102 with perforations 104. Perforations 104 in the sump pump liner are necessary to allow water rising in the soil to enter the liner, while straining out gravel and debris that would clog the pump inlet. In some embodiments, the sump 102 also include an annular rim 106 and a sump floor 108. The annular rim 106 can allow the sump 102 to snuggly fit into a cavity within the basement floor.

Figure 2:
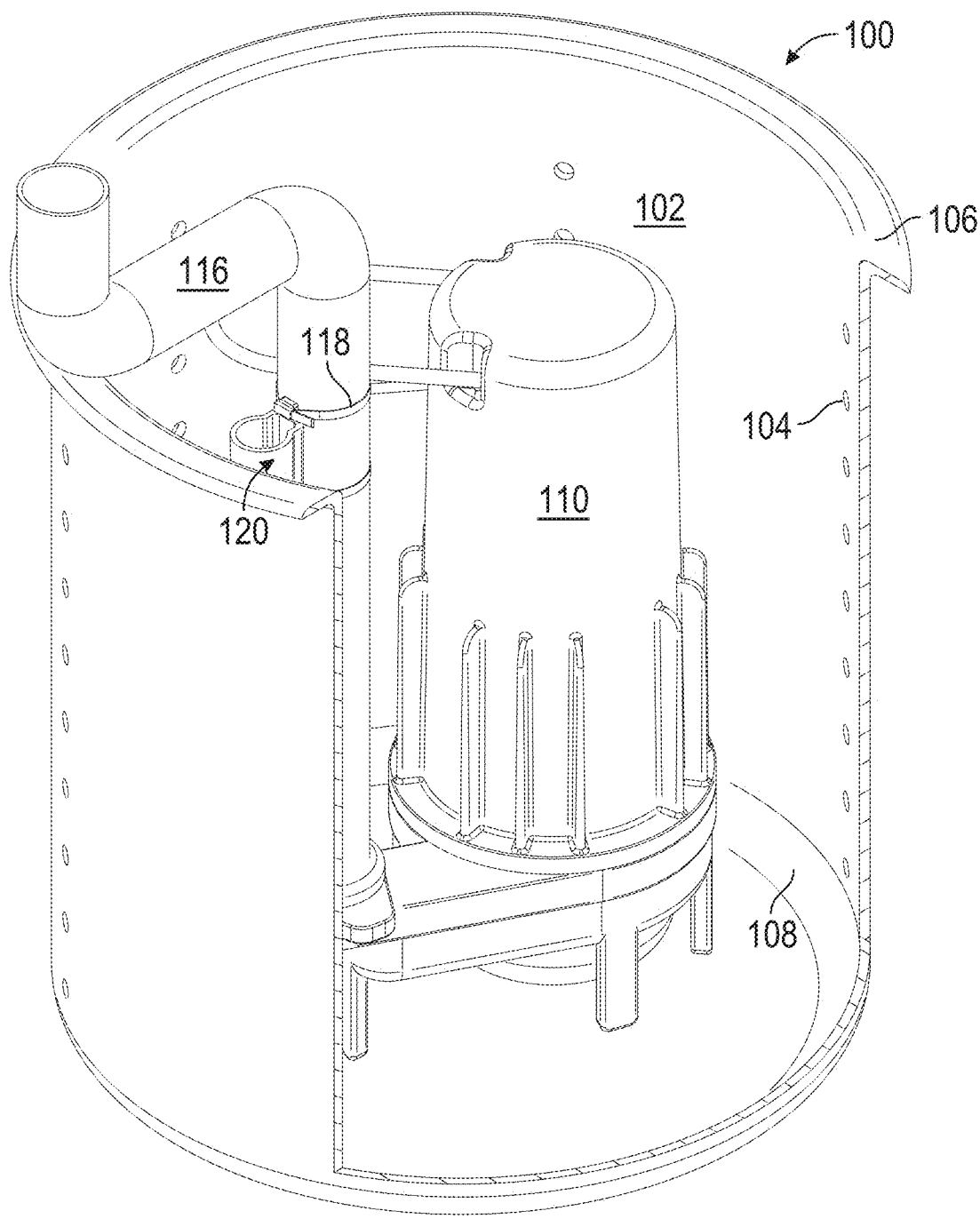
FIG. 2 shows a partial-section and perspective view of the environment of FIG. 1, according to some aspects of the present disclosure.

There are generally two types of sump pumps—pedestal and submersible. FIGS. 1-2 show a submersible sump pump 110 mounted entirely within the sump 100 and at a lower portion of the sump 100. While not shown, there are embodiments where the submersible sump pump is replaced with a pedestal sump pump (e.g., the motor would be mounted above the sump—where it is more easily serviced, but also more conspicuous).

Once the level of water in the liner accumulates to an initial preset depth, a float switch typically activates the sump pump 110 to convey the collected water out of the basement through, at least in part, a discharge line 116 (e.g., a pipe). The float switch is a type of electronic level sensor, a device used to detect the level of liquid within the sump 100. The discharge line 116 carries at least some of the fluid from the sump to a second, external environment 114, such as a municipal storm drain, a dry well, or a sanitary sewer system.

In an alternative embodiment (not shown), there can exist yet another pipe not in fluid communication with the sump pump 110 which carries at least some of the fluid to a third, deeper, and/or external environment, such as an exterior drainage system (e.g., a French drain).

Figure 3:
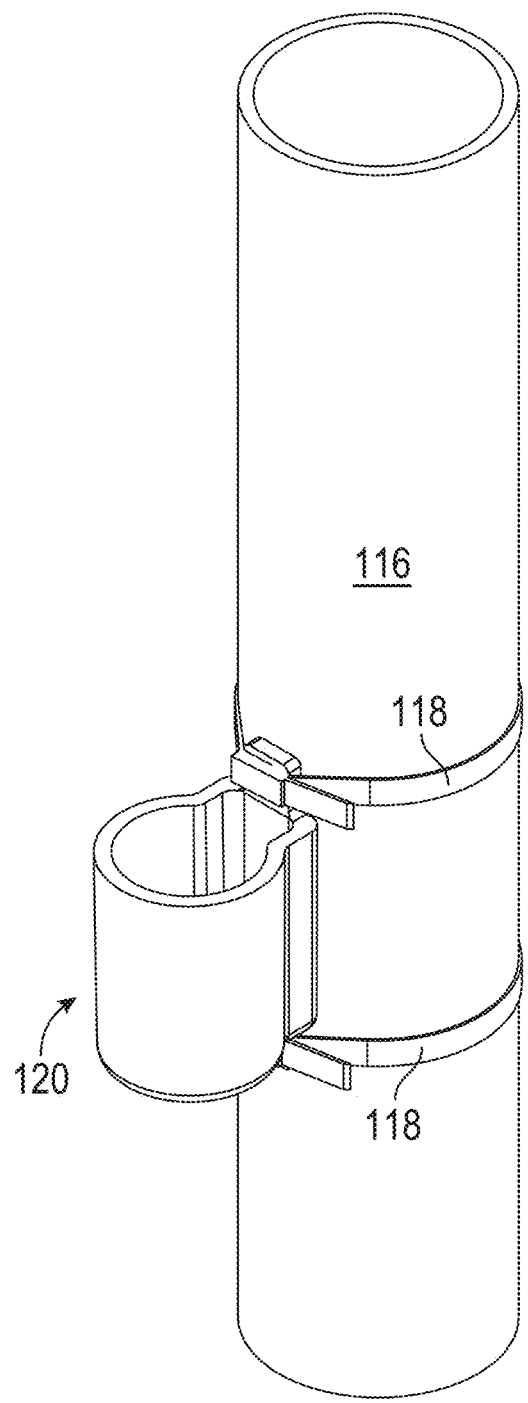
FIG. 3 shows the level indicator fastened to a discharge line, according to some aspects of the present disclosure.
Figure 4:
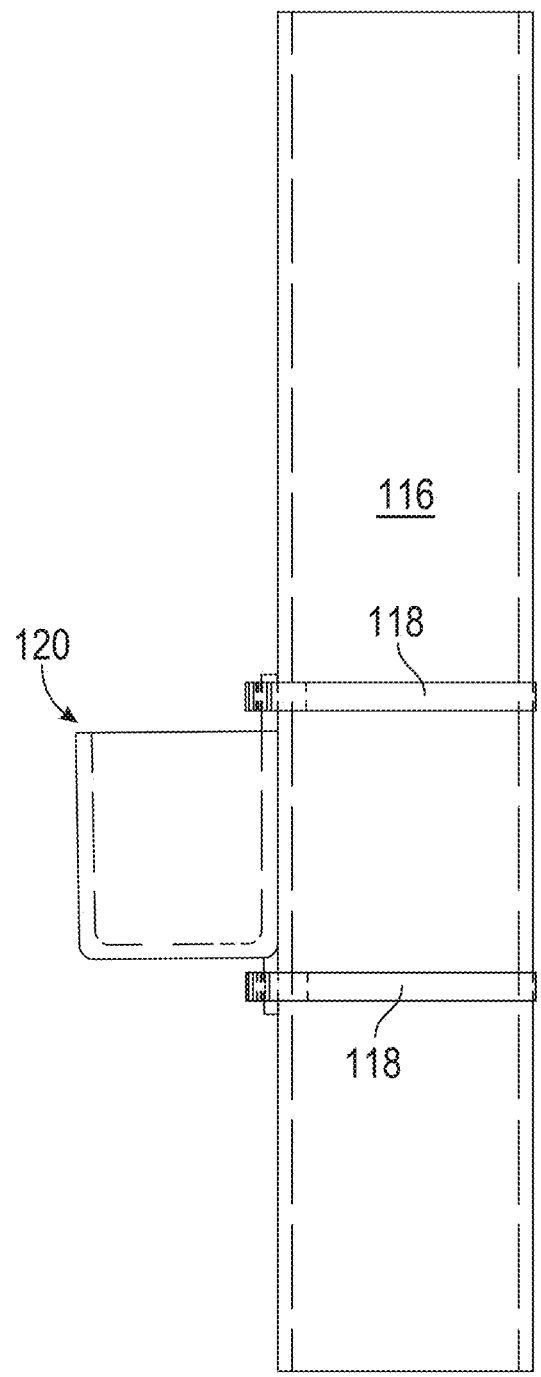
FIG. 4 shows a side elevation view of the level indicator fastened to the discharge line, according to some aspects of the present disclosure.

Also included in the sump pump system is a level indicator 120 fastened to the discharge line 116, sump pump 110, or an interior wall of the sump 100. For example, the level indicator 120 is shown fastened via fasteners 118 (i.e. nylon ties) to the discharge line 116 in FIGS. 3-4. However, preferably, the level indicator 120 is fastened at a location remote of the sump pump 110 and below the first, elevated environment 112.

The level indicator 120, preferably without the use of electronics, works to indicate whether a liquid (e.g., water) has risen above a predetermined level. To properly position said level indicator 120, an installer should locate a predetermined level by anticipating where an existence of liquid is problematic. The installer should position the level indicator 120, such as a bucket or other similar mechanism, below where the existence of liquid is problematic. This position should still be above where the existence of liquid is to be ordinarily expected. The level indicator 120 should then be configured to retain some of the liquid should the liquid rise above the predetermined level.

The above installation will allow for a homeowner to confirm the level indicator 120 has, at least at one point in time, retained water, thereby indicating the liquid rose above the predetermined level. To make such a confirmation, the owner may have to remove a lid, or some other type of obstruction, to the sump 100, so that the level indicator 120 is viewable.

The level indicator 120 is preferably secured to the discharge line 116 (e.g., a pipe located within the sump which carries water to an external location from the house). Alternatively, the level indicator can be secured to an upper portion of an inner wall of the sump.

Figure 5:
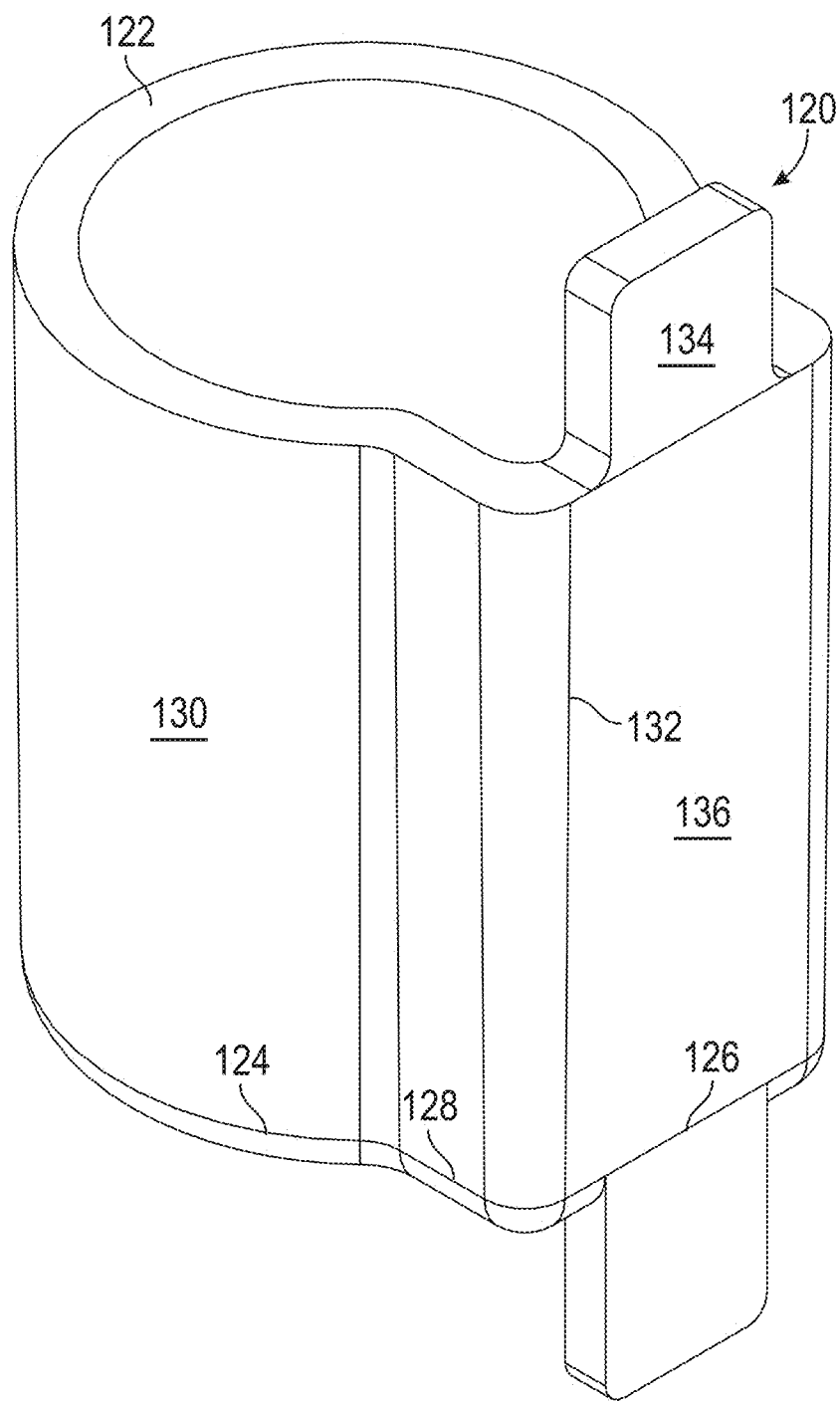
FIG. 5 shows a detailed perspective view of the level indicator, according to some aspects of the present disclosure.
Figure 6:
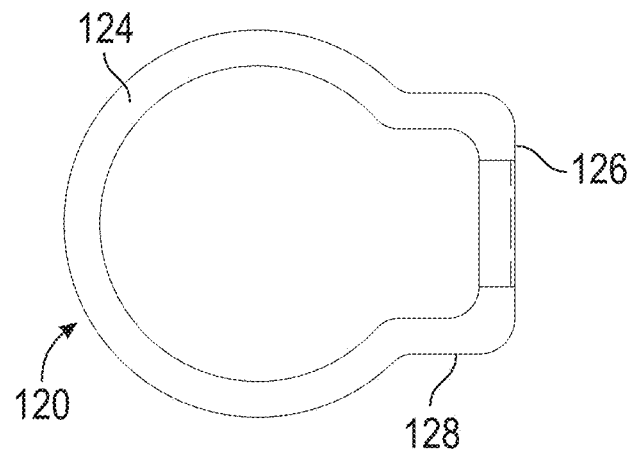
FIG. 6 shows a top elevation view of the level indicator, according to some aspects of the present disclosure.
Figure 7:
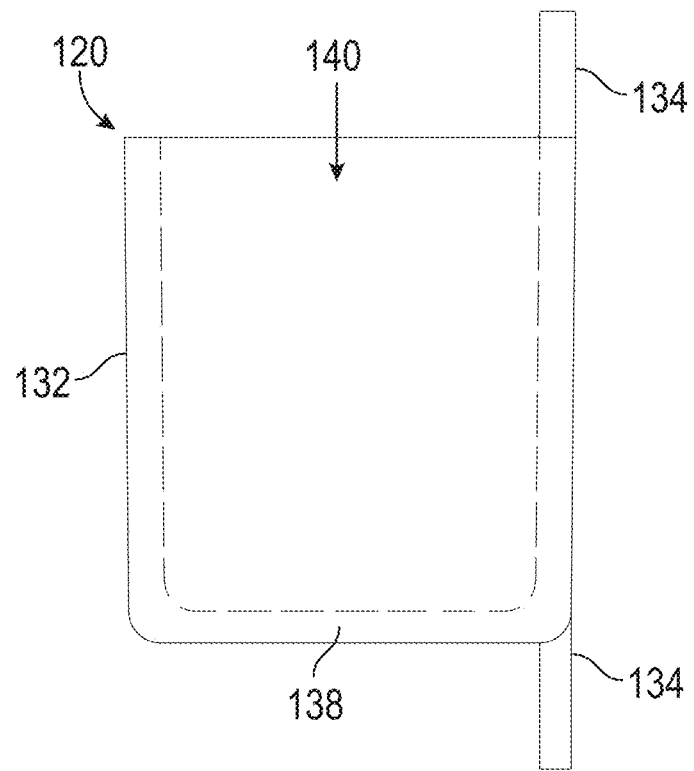
FIG. 7 shows a side elevation view of the level indicator, according to some aspects of the present disclosure.

As shown in FIGS. 5-7, the level indicator 120 includes a sidewall 130 enclosed on all sides. The sidewall 130 has a depth 132 and a perimeter 122 traversing said depth 132. The perimeter 122 comprises an arc 124 and a chord 126. The arc 124 and the chord 126 are located within a common plane perpendicular to said depth 132.

The perimeter 122 can comprise a circular, minor segment. Alternatively, the arc 124 can comprise a circular major arc and the perimeter 122 can comprise parallel protrusions 128. In such a configuration, the protrusions 128 can extend orthogonally from the chord 126 toward the circular, major arc.

The bottom surface or base 138 retains fluid which spills over the perimeter 122 after it rises above the predetermined level. In one embodiment, the bottom surface or base 138 is parallel with the perimeter 122. In another embodiment, a fillet can exist between the sidewall 130 and the bottom surface or base 138. Furthermore, while the predetermined level is shown in FIGS. 5-7 at the top of depth 132, it is to be appreciated there are embodiments where fluid is allowed to pass into the level indicator prior to reaching to the top of said depth 132.

Tabs 134 extend orthogonally from the perimeter 122 beyond said depth 132, such as in an upward or downward direction from the perimeter 122. The tabs 134 and backwall 136 help fasten the level indicator 120 to another object, such as discharge line 116. The level indicator 120 preferably includes no electronics. While not shown, it is to be appreciated the level indicator 120 could however include a liquid contact indicator which changes colors upon contact with a liquid, thereby further extending the time in which an owner can confirm the sump pump has failed or is about to fail. Additionally, it is to be appreciated the level indicator can be produced with various manufacturing methods. One non-limiting example of which is feeding a three-dimensional printing filament (e.g., thermoplastic feedstock) through a three-dimensional printer. Another non-limiting example of which is molding the level indicator 120 by shaping liquid or pliable raw material using a mold.

From the foregoing, it can be seen that the present invention accomplishes at least all of the stated objectives.

LIST OF REFERENCE CHARACTERS

The following reference characters and descriptors are not exhaustive, nor limiting, and include reasonable equivalents. If possible, elements identified by a reference character may replace or supplement any element identified by another reference character.

100 sump
102 liner
104 perforations
106 annular rim
108 sump floor
110 sump pump
112 water from a first, elevated environment
114 water to a second, external environment
116 discharge line (e.g., a pipe)
118 fasteners (e.g., band clamps, nylon ties, etc.)
120 level indicator
122 perimeter
124 arc
126 chord
128 protrusion
130 sidewall
132 depth
134 tab
136 backwall
138 bottom surface or base
140 water from above a predetermined level The present disclosure is not to be limited to the particular embodiments described herein. The following claims set forth a number of the embodiments of the present disclosure with greater particularity.

What is claimed is:

1. A level indicator comprising:
    a sidewall enclosed on all sides, said sidewall having a depth and a perimeter traversing said depth, said perimeter comprising an arc and a chord, said arc and said chord being located within a common plane perpendicular to said depth;
    a closed bottom surface configured to retain fluid captured within the perimeter;
    a tab extending orthogonally from the perimeter beyond said depth, said tab configured to fasten the level indicator to another object; and
    a liquid contact indicator which changes color upon contact with fluid captured within the perimeter.

2. The level indicator of claim 1 wherein the chord has a length equal to a minor segment of the arc.

3. The level indicator of claim 1 wherein the arc is a circular, major arc.

4. The level indicator of claim 3 wherein the perimeter further comprises parallel protrusions, said protrusions extending orthogonally from the chord toward the circular, major arc.

5. The level indicator of claim 1 wherein the bottom surface is parallel with the perimeter.

6. The level indicator of claim 1 further comprising a fillet between the sidewall and the bottom surface.

7. The level indicator of claim 1 wherein the tab extends upwardly from the perimeter.

8. The level indicator of claim 7 further comprising another tab extending downwardly and orthogonally from the perimeter beyond said depth.

9. The level indicator of claim 1 wherein the level indicator is produced with a three-dimensional printer and further wherein the level indicator includes no electronics.

10. A sump pump system comprising:
a sump positioned to collect fluid from a first, elevated environment;
a pipe to carry at least some of the fluid from the sump to a second, external environment;
a sump pump for forcing the at least some of the fluid to the second, external environment; and
a level indicator fastened to the pipe or an interior wall of the sump, said level indicator being fastened at a location remote of the sump pump and below the first, elevated environment, wherein the level indicator comprises:
a sidewall enclosed on all sides, said sidewall having a depth and a perimeter traversing said depth, said perimeter comprising an arc and a chord, said arc and said chord being located within a common plane perpendicular to said depth;
a closed bottom surface configured to retain fluid captured within the perimeter;
a tab extending orthogonally from the perimeter beyond said depth, said tab configured to fasten the level indicator to another object;
a liquid contact indicator which changes color upon contact with fluid captured within the perimeter.

11. The sump pump system of claim 10 wherein the first, elevated environment is the basement of a home, and the second, external environment is a municipal storm drain, a dry well, or a sanitary sewer system.

12. The sump pump system of 10 further comprising at least one additional pipe not in fluid communication with the sump pump and configured to carry at least some of the fluid to a third, deeper, and/or external environment.

13. The sump pump system of claim 12 wherein the third, deeper, and/or external environment is an exterior drainage system.

14. The sump pump system of claim 13 wherein the exterior drainage system is a French drain.

15. The sump pump system of claim 10 wherein the sump pump is a submersible sump pump positioned toward a lower portion of the sump.

16. The sump pump system of claim 10 wherein the sump pump is a pedestal sump pump with a motor mounted above the sump.

* * * * *